US005492881A

United States Patent [19]
Diamond

[11] Patent Number: 5,492,881
[45] Date of Patent: Feb. 20, 1996

[54] SORBENT SYSTEM

[76] Inventor: Charles M. Diamond, Rte. 302, Box 18, Bath, N.H. 03740-0018

[21] Appl. No.: 218,114

[22] Filed: Mar. 25, 1994

[51] Int. Cl.$^6$ .............................. B01J 20/22; B01J 20/10
[52] U.S. Cl. ........................ 502/401; 502/404; 502/407; 502/412
[58] Field of Search ................................ 502/401, 407, 502/412, 404

[56] References Cited

U.S. PATENT DOCUMENTS

| | | | |
|---|---|---|---|
| 3,607,741 | 9/1971 | Sohnius | 210/36 |
| 4,259,444 | 3/1981 | Chakrabarty | 435/172 |
| 4,377,506 | 3/1983 | Sprague | 252/609 |
| 4,537,877 | 8/1985 | Ericsson | 502/402 |
| 4,829,045 | 5/1989 | Frausham | 502/401 |
| 5,035,804 | 7/1991 | Stowe | 210/671 |
| 5,302,570 | 4/1994 | Newman | 502/401 |

*Primary Examiner*—Anthony McFarlane
*Assistant Examiner*—Nhat D. Phan

[57] ABSTRACT

The present invention provides a sorbent with a high pickup ratio (>30 to 1) that has environmental benefits relating to renewable resource use of waste material as primary ingredients and is biodegradable; that is suitable for use on water and on land in a wide variety of forms; that is fire retardant; that incorporates a manufacturing process resulting in a finished product of low embodied energy; and results in a sorbent that is uncommonly simple, inexpensive, and effective. The improved sorbent also provides three options for disposal when the sorbent is full of oil. The first option allows extraction of absorbed oil by simple compression that results in a 70% recovery of oil without contamination by water. The used sorbent can be reused repeatedly afterward. A second option allows a used sorbent that, although flame resistant in its unused state, can be burned as fuel to recover 100% of energy with the sorbent contributing only 1% ash. The invention's third option allows the addition of oil digesting microbes to the sorbent. A sorbent with such microbes would allow dumping the used sorbent contaminated with oil in the environment. The microbes would provide effective bioremediation of used sorbent. A long shelf-life is possible because the sorbent would include a system for protection of oil digesting microbes together with their necessary nutrients while being maintained in a dormant state until their activity is triggered. The sorbent has the capability of remediating a wide range of liquid spills other than just oils or hydrocarbons, such as synthetic oils, fuels, coolants, paints, polymers, alcohols, blood and plasma, pharmaceuticals, sewage, solvents, oils with PCB's, aromatics, chromates, cyanides, sulfides, insecticides, and herbicides. The sorbent could also be customized with microbes to bioremediate specific contaminants and to pickup a wide variety of liquids.

20 Claims, 1 Drawing Sheet

SORBENT SYSTEM

BACKGROUND OF THE INVENTION

1. Field of the Invention

The present invention relates generally to sorbent materials and process for the manufacture thereof; and more particularly to an effective sorbent for either water or land recovery of oil spills which allows for the option of: i) recovery of the oil and reuse of the sorbent, ii) use of sorbent and oil as a fuel, or, iii) with the addition of suitable microbes, bioremediation of the oil.

2. Description of the Prior Art

Accidental oil spills, whether on land or water, are a source of concern for the entire planet. Oil slicks on the surface of open bodies of water may result from accidental spills when a ship is being fueled; when a tanker is being loaded or unloaded; or when a tanker is wrecked and breaks up on the high seas. In some instances, oil appears on the surface of the water in rivers or ports when oil-carrying storage tanks are flushed with water. Oil slicks may also occur when leaks, fires, or explosions are encountered during offshore drilling operations.

When an oil spill occurs, the oil is carried by tides, currents and winds to adjacent shore lines where it fouls beaches, kills marine animal life and plant life and adversely affects boating, bathing, fishing, and drinking water. When oil slicks develop around loading docks, ship yards, offshore drilling platforms, barges and piers, the fire potential is very serious, and in the event a slick should be ignited, the resulting fire may cause loss of life as well as property and materials. The major oil spills of recent years, wherein millions of gallons of oil have been abruptly dumped into the ocean, have magnified the need for rapid and effective means of containment.

Land is not immune from oil spills of all kinds. When a tractor-trailer carrying oil products turns over on an interstate highway in the middle of a city or a home heating oil delivery person dumps a couple of hundred gallons of oil in a basement by mistake, the resulting potential for fire, pollution, and loss of life or property is no less real than if the accident had happened at sea. In areas that have a fragile water supply system, the threat of an oil spill that could destroy the water source is a real concern.

Once an oil spill occurs, pollution damage begins immediately and is magnified many times as the oil disperses, especially as it is washed ashore in the case of a spill on a waterway. Of the millions of dollars which are spent on the cleanup of oil spills, the major part is devoted to cosmetic purposes, cleaning up the oil after the major damage has been done. Dramatic savings are realized if the oil can be contained and the damage arrested at the scene of remediation, including pickup and the spill.

Various methods have been employed to cope with oil spills; however, such prior art methods suffer from a number of disadvantages. In all instances of oil spills, it is desirable to achieve a number of site and circumstance specific objectives. Oil spills on land are most commonly picked up with inexpensive clay based materials and other low cost inorganic sorbents. If oil pickup is in an industrial environment, such as on industrial floors or on walkways, often the only consideration is the lowest possible cost sorbent. However, in other instances it must also be non-abrasive to machinery. If oil pickup is on exposed ground, it may be desirable or required for the unused residual sorbent to be biodegradable and safe to humans, plants, animals, and the environment. When the used oil saturated sorbent is to be disposed of in a landfill or when there will be concern about the possible harmful effects of used oil saturated sorbent remaining in the environment at the spill site, it may be necessary or desirable to remediate the used oil saturated sorbent with a separate step of final remediation by introducing oil digesting microbes. In the instance of oil spills occurring on land that require fast response or in locations difficult to reach by vehicle, the sorbent of choice should be as light and compact as possible to facilitate transfer by personnel on foot. That situation requires a sorbent with a high pickup-to-weight ratio plus high oil containment capability. For oil spills on water, the sorbent of choice should be a lightweight, floating sorbent material that can be used loose or in pads, socks, pillows, booms, or as an oil extracting and water rejecting filter element that ideally would pickup the oil without contamination by water. The sorbent Of choice for oil spills on water should also be compressible and reusable to enable extraction of the oil in a condition such that the oil and also the sorbent is reusable, and uncontaminated by water. It is often desirable for the sorbent of choice for oil spills on water to be biodegradable and safe to shellfish, aquatic plants, or any aquatic life, and especially not to contain any plastics or toxic ingredients.

In many instances the used saturated sorbent will be desired for use as fuel to be burned to recover the available energy, and as such, it must be low in ash content and without any ingredients that contribute harmful or undesirable products of combustion.

If large quantities of sorbent are going to be stored or stockpiled, it is desirable that the unused sorbent not support combustion, thereby providing an extra measure of safety both during the manufacturing process as well as in distribution and storage. It is also desirable for a sorbent to be easily identified by a unique colorant so as not to be confused with something of potentially similar appearance when in the field or when not in a labeled container.

To facilitate the lowest possible cost the sorbent should require very low energy to manufacture with simple low cost machinery and extremely low cost raw materials, preferably of benign industrial or municipal waste raw materials that are in abundant supply at present and in the foreseeable future. It is also desirable for the ideal sorbent to have the capability of remediating a wide range of liquid spills other than just oils or hydrocarbons, i.e., synthetic oils and fuels, coolants, paints, polymers, alcohols, blood and plasma, pharmaceuticals, sewage, solvents, oils with PCB's, aromatics, chromates, cyanides, sulfides, insecticides, and herbicides.

The present state of the art requires making a choice of the sorbent to be used for each circumstance from among a large number of types of sorbent materials available. Dramatic savings are available with the advantages of having one low cost sorbent that will accomplish all these important objectives of spill remediation. This would obviate having to inventory a wide variety of sorbents for their different uses. Within the prior state of art there is no singular composition of matter that achieves all these important objectives.

In some of the prior art, sorbent materials such as sawdust, peat fibers, diatomaceous earth, expanded perlite or vermiculite, and the like, have been used to spread upon an oil slick in order to soak up the oil. In other prior art, sorbents such as the above are used in combination with other reagents to clean up oil spills. For example, in U.S. Pat. No. 5,035,804, Stowe teaches combining perlite, vermiculite, or sand with a hydrophobic/oleophilic coating of sulfur, a metallic sulfate, an alkali metal nitrate, and burned hydrocarbon oil. Some of these compounds sink when the oil is sorbed effectively shifting the pollution from the water surface to the ocean or river bottom. The process of recovery of the oil is time consuming and relatively expensive using this invention.

In U.S. Pat. No. 5,037,557, Warrenchak et al. teach a method of sorbing hydrocarbons from water using treated, fumed silica. The oil picked up by this invention is from 1 to 10 times the weight of the treated silica. However, if less than an excess of silica is used, the resulting globules are tacky and difficult to screen off. Thus, 100 gallons of oil may require 120 to 180 pounds of treated, fumed silica to capture the oil successfully.

Heretofore clay-based materials and other inorganic sorbents have been utilized in the control and removal of undesired liquids from industrial floors and walkways and similar industrial environments. But, such materials are not sufficiently effective as determined by sorptive capacity; not convenient as determined by bulk density, typically 25 to 40 lbs./ft$^3$; and not readily decomposable or degradable, as the wholly inorganic constituents preclude incineration even when saturated with combustible liquid material or the like. A recent advance in sorptive media entails the pelletization of cellulose fibers and clay and/or other inorganic solids as disclosed in U.S. Pat. No. 4,374,794 by Kok. However, the action of pelletizing a combination of cellulose fibers and inorganic solids or "fibers" requires use of considerable force applied to the material in order to extrude it form a die orifice. The requisite force is a compressive action that eliminates interstitial spaces in the body of the pellet, creates a non-porous surface, creates a dimensionally stable cylindrical shape, and results in a product having a bulk density typically ranging from 25 to 40 lbs./ft$^3$. Moreover, when used as an absorptive media on floor surfaces, the extruded pellets present a hazardous interface between the floor surface and pedestrian traffic. Further, such extruded pellets exhibit low absorptive capacities.

Each particular sorbent or class of sorbents presents its own difficulties. The inability of many sorbents to resist sorption of water is a very serious limitation considering that the most serious oil clean-up operations involve discharge of oil in seas or other bodies of water. Attempts in the past to impart the requisite hydrophobicity to oil sorbents, even where some success was obtained, have resulted in a sorbent whose cost is prohibitive.

A difficulty with materials which are mere sorbents is that they are sorbents for both water and oil, so that a large part of the sorptive capacity of the particles is consumed by saturation with water and is unavailable for pick-up of the oil. For example, oil-water emulsions which are used as cutting fluids require separation of oil from the water prior to disposal.

Oil spills occurring at sea, in lakes, in rivers, and streams present a special problem. In order to remove hydrocarbons from water effectively, it is necessary that the sorbent sorb only the hydrocarbon and not the water. That is, the material should be both oleophilic and hydrophobic. Therefore, in other prior art, efforts have been made to coat or otherwise modify the sorbents to enhance their selectivity for oil over water. U.S. Pat. No. 4,670,156 by Grenthe discloses the use of fibrous cellulosic material, e.g. sulphite reject, which is subjected to forced heating to enhance hydrophobic and oleophilic properties. However, the absorption ratio is only 3 or 4 to 1. After a few days the material loses its hydrophobic characteristic to the extent it will sink in water, and the cost of manufacturing is higher.

Another patent of interest is one recently issued to Papyrus Kopparfors A.B. of Molndal, Sweden as the assignee of Thomas Ericsson, U.S. Pat. No. 4,537,877. Ericsson discloses various examples of a particulate oil sorbing composition comprising at least 50 percent by weight hydrophobic cellulose pulp fibers" . . . blending with at least 30 percent up to 50 percent of an inorganic cellulose paper pulp filler . . . ". Unfortunately, the inclusion of large amounts of inorganic cellulose paper pulp fillers—including particularly amounts in the range proposed by Ericsson comprising at least 30 percent by weight and ranging up to 50 percent by weight of the basic composition—present a number of problems. First and foremost, the inorganic solids or "fillers" tend to increase the bulk density of the resulting product which generally ranges from 16 to 20 lbs/ft$^3$; and, as a consequence, even though the product is hydrophobic, upon saturation with oil it will not float. Moreover, the large amount of inorganic solids present tends to reduce both the rate of absorption and the absorptive capacity of the product produced. Additionally, the inorganic solids are not readily flammable and/or degradable. These inorganic solids cannot be satisfactorily disposed of by incineration, thus producing a significant quantity of non-degradable ash, which creates a high-cost disposal problem, and reducing the amount of heat that can be generated per cubic volume of material. Phillips (below) reports Ericsson's invention leaves 44 percent ash after incineration. The inorganic solids present further create significant dust problems resulting in eye and/or breathing irritants and undesirable abrasion of production equipment.

Phillips in U.S. Pat. Nos. 4,931,139 and 5,091,245 teaches a cellulose substrate absorbent with an inorganic solids content of not more than 30 percent dry weight. The absorption capacity is just over 3 to 1 (301 percent by weight) after 16 hours. After an incineration test, there was only a 9.6 percent ash. Still a better pick-up ratio and ash content is desirable.

A particularly serious limitation of any and all sorbents of the prior art is the failure to specifically address the problem of environmental disposal of the sorbent once the oil has been sorbed. Nutrients and protection are necessary for microbes when they are included as a component for effective bioremediation of used sorbent when disposed of in the environment. To facilitate the most efficient microbial action, it may also be necessary to introduce both a system of protection of the microbes as well as introduction of microbial nutrients to enhance the microbial effectiveness, survival, and growth.

It would be advantageous to provide an improved single composition of matter in a sorbent that achieves all of the above objectives and which: is suitable on water and on land, is fire retardant, has a high pickup ratio (>30 to 1), is not limited to use in any one form, can be used as a filter element to separate oil from water, is non-abrasive to machinery, and is simple, inexpensive, and effective. It would be further advantageous to have a sorbent that offers a choice of disposition of the used product: a sorbent which can be reused repeatedly after oil extraction by compression which facilitates 70 percent recovery of oil without contamination by water; used sorbent which can be burned as fuel to recover 100 percent of energy and contributes only 1 percent ash; or a sorbent in which microbes are included as a component for effective bioremediation of used sorbent if disposed of in the environment.

SUMMARY OF THE INVENTION

The present invention in its most simple form or embodiment is directed to a composition of matter and a method of manufacturing that composition. The basis of the composition is finely ground cellulose treated with an additive to render it both hydrophobic and oleophilic. To this combination is added a fire retardant. Next, encapsulated, dormant, oil digesting microbes are added with sufficient nutrients, nitrogen, and phosphorus to reproduce in sufficient quantities when liberated to bioremediate the amount of oil sorbed by the sorbent. A dye is added to differentiate between embodiments when used in the field out of marked containers.

The process comprises the following steps: grinding or shredding an organic form of cellulose into finely ground particles, mixing with a fire retardant, mixing dry granulated microbes previously encapsulated with sufficient nutrients, spraying the mixture with a dye, and finally, spraying the entire mixture with the additive to render it hydrophobic and oleophilic.

Clearly, the sorbent may have a variety of configurations and may be made from a variety of materials. For example, there is a long list of chemicals for rendering the cellulose hydrophobic. The microbes could be chosen from a list depending on the specific type of oil or hydrocarbon to be digested.

The primary object is to make a safe sorbent with a high pickup ratio from waste materials that allow for a choice of disposal by reclaiming the oil and reusing the sorbent; by burning the combination with minimal ash residue; or by dumping the used sorbent in a landfill where the contaminant and the biodegradable sorbent will be remediated with microbes present in the invention.

It is a further object of the present invention to provide a sorbent with a high pickup ratio (>30 to 1) that has environmental benefits relating to renewable resource use of waste material as primary ingredients and is biodegradable; that is suitable for use on water and on land in a wide variety of forms; that is fire retardant; that incorporates a manufacturing process resulting in a finished product of low embodied energy; and results in a sorbent that is uncommonly simple, inexpensive, and effective.

It is another primary object of the present invention to provide three options for disposal of the sorbent when contaminated oil. The first option is a sorbent that facilitates extraction of sorbed oil by simple compression that results in a 70 percent recovery of oil without contamination by water and that can be reused repeatedly after oil extraction by compression. A second option would be a sorbent that, although flame resistant in its unused state, can be burned as fuel to recover 100 percent of energy with the sorbent contributing only 1 percent ash.

The primary object's third option consists of adding oil digesting microbes to the sorbent. A sorbent with such microbes would allow dumping the used sorbent contaminated with oil in the environment. The microbes would provide effective bioremediation of used sorbent. Second, the sorbent would include a system for protection of oil digesting microbes together with their necessary nutrients while being maintained in a dormant state until their activity is triggered allowing for a long shelf life. The third advantage is a sorbent that can be customized with microbes to bioremediate specific contaminants and to pickup a wide variety of liquids.

These and further objects of the present invention will become apparent to those skilled in the art after a study of the present disclosure of the invention and with reference to the accompanying drawings which are a part hereof, wherein like numerals refer to like parts throughout, and in which:

BRIEF DESCRIPTION OF THE DRAWINGS

The single FIGURE represents a schematic view of an apparatus for manufacturing the improved sorbent.

DESCRIPTION OF THE PREFERRED EMBODIMENTS

Figure 1:
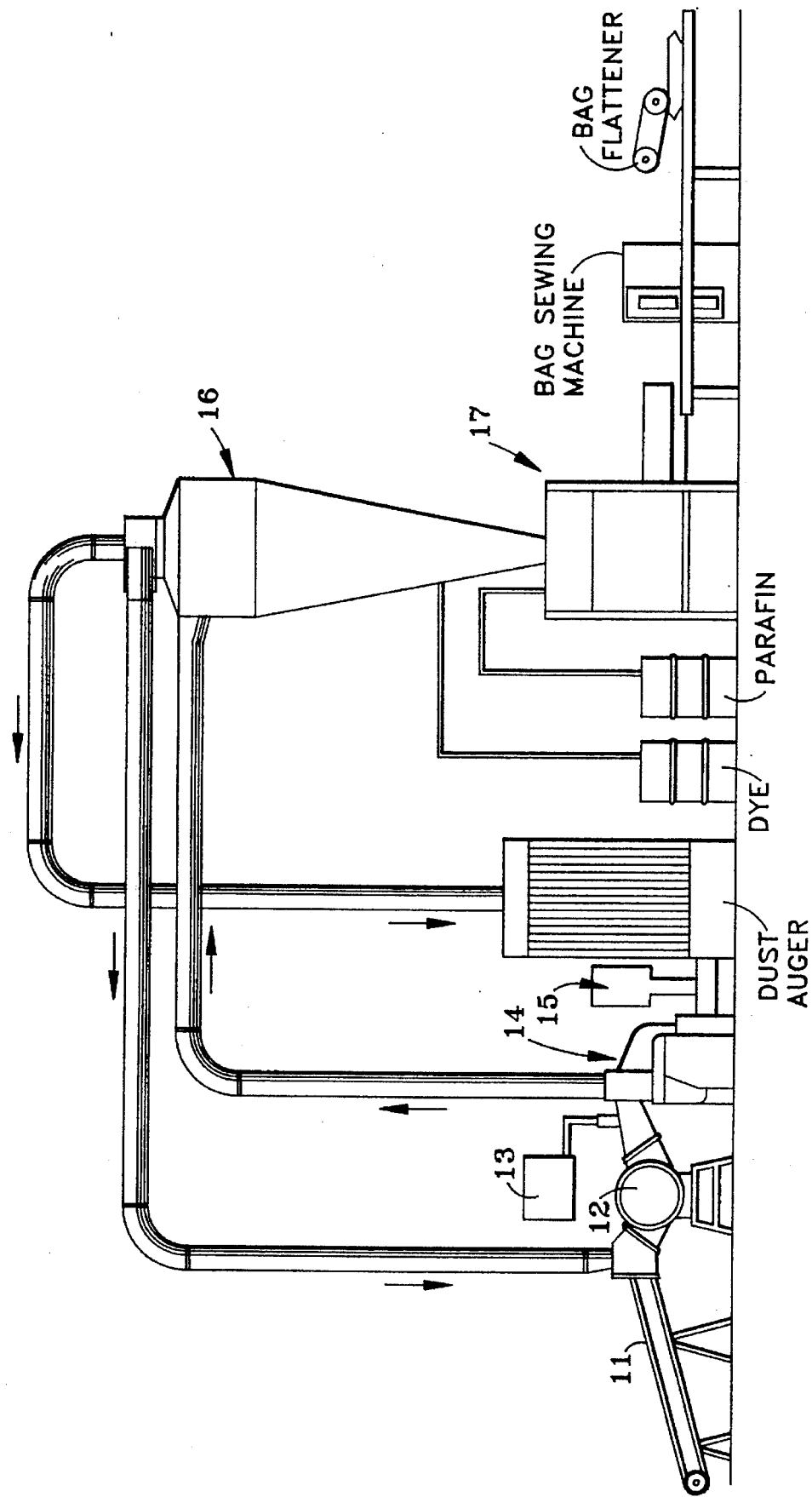

The following is a description of the preferred embodiment of the invention. It is clear that there may be variations in the ingredients from the beginning substrate to the microbes employed. However, the main features of the improved sorbent material are the simplicity of starting materials, finely ground cellulose and a basic fire retardant coated with a common paraffin. This combination has the absorption capacity of over 30 times its own weight and allows for disposal by either the recovery of both the oil and the sorbent or their burning as a fuel. The addition of encapsulated microbes extend the flexibility of the material in at least two important ways. First, the used sorbent may be abandoned because the microbes will bioremediate the contaminate and the sorbent itself is biodegradable. Next, the encapsulation permits a shelf-life of three years or more so the material can be available and ready for use when needed.

A preferred embodiment of the present invention is the composition by weight, 85 percent ground cellulose as the sorbent substrate. The cellulose pulp fibers may be rendered hydrophobic by any conventional hydrophobing treatment. In this example, the addition of 10 percent by weight of paraffin is used as the hydrophobic additive. A 5 percent by weight of Sulfate Activated Boric Acid (sodium polyborate) is the fire retardant additive (under the trade name BORON-10® available from INCIDE TECHNOLOGIES, INC. of Phoenix, Ariz.). As little as 0.5 percent ammonium sulfate can be used as an effective fire retardant. The optimum percentage of ammonium sulfate is about 2.5 percent. The combination of these three result in the base composition of the hydrophobic, fire retardant, sorbent material.

To each twenty pounds of this hydrophobic fire retardant base material is added two grams of oil digesting microbes together with their nutrients bound together in granules with a protective oleophobic and hydrophilic encapsulant. In the procedure of adding the oil digesting microbes the dried bacterial saprophytes are combined in a mixture of sugar, wheat bran, supplemental nutrient salts (these include nitrogen, phosphorus, calcium, magnesium, zinc, iron, sodium, and sulfur) and pH buffers (to achieve a pH of 6.8–7.2 when hydrated) by ENVIROFLOW, INC. of Manassas, Va. under the trade name DBC PLUS® TYPE R-5 DRIED BACTERIAL CULTURE. Since the cell components of the microbes are in the ratio of 100:15:1 respectively of carbon, nitrogen, and phosphorus, it follows that for every 100 pounds of carbon contained in the sorbed liquid hydrocarbon to be biodegraded the microbes must also consume an external source of 15 pounds of nitrogen and one pound of phosphorus plus trace quantities of calcium, magnesium, zinc, iron, sodium, and sulfur. Without these nutrients microbes cannot biodegrade oil, cannot reproduce and will not survive. For the above reason the ratio of 15:1 respectively of nitrogen to phosphorus plus trace quantities of calcium, magnesium, zinc, iron, sodium, and sulfur should be closely adhered to in preparing the nutrient formulation.

Above two grams of microbes per twenty pounds of substrate were used for the preferred embodiment. The generic formula of calculating the quantity of microbes is dependent on the liquid capacity of the specific substrate. For the purposes of this invention, the amount of microbes (derived from total plate count per gram) to be added to the common sorbent substrate range from $1 \times 10^5$ to $1 \times 10^{11}$ (100,000 to 100 billion) per pound of sorbed liquid capacity of the specific sorbent substram. Once these calculations have been made, the quantities can be expressed as grams of microbes per pounds of substrate for that specific substrate and liquid to be sorbed.

For the purposes of this invention the amount of nutrient prepared according to the aforementioned formula to be added with the microbes in the sorbent material should be in a ratio greater than 10:1 by weight relative to the weight of microbes included in the sorbent material. However, for most applications a ratio greater than 100:1 is recommended as a minimum to ensure effective propagation and growth of microbes when bioremediating used sorbent in a natural environment.

Also, sufficient colorant in the form of common food dye to achieve product color identification is added. In this preferred embodiment the color of choice is green. Therefore, sufficient commonly available green food coloring is added to achieve the desired degree of green color to impart adequate product identification to the cellulose base.

To achieve a protective oleophobic and hydrophilic encapsulation this dry mixture of microbes and nutrients is first coated and granulated with sucrose, by COATING PLACE, INC. of Verona, Wis. Starch, gelatin, and the like also work effectively as an alternate coating. To achieve a protective oleophobic or semi-oleophobic encapsulation it would be clear to use material such as paraffin, other waxes, polyvinyl alcohol, hydroxyethyl cellulose, synthetic resins and the like as the protective coating for the microbe nutrient mixture. The importance of a protective oleophobic and hydrophilic encapsulation containing the dry mixture of microbes and nutrients is due to the fact that for all practical purposes in the present state of the art there are no available microbes that can eat pure oil, without water, without other nutrients, without oxygen, etc. and still bioremediate liquid hydrocarbons effectively, efficiently, or within any reasonable period of time. The available microbes that can effectively, efficiently, bioremediate liquid hydrocarbons within any reasonable period of time cannot reproduce, and will not survive without their necessary nutrients. The available microbes cannot survive when saturated in oil such as in the environment of an oil saturated sorbent since this will preclude their receiving of oxygen, other nutrients, and water which is essential to their survival. The oleophobic and hydrophilic encapsulation containing the dry mixture of microbes and nutrients protects the contained microbes in a dormant state for up to three years or more until optimal conditions for their propagation and survival are achieved. The effectiveness of the microbes are enhanced by being in a dried dormant state (for delay of action until exposed to moisture). Since the reactivation of the microbes is dependent upon moisture reaching the protective oleophobic and hydrophilic encapsulation, the microbes remain in a protected dormant state throughout the cold winter months as if in a time capsule waiting for the optimal conditions to arrive. These optimal conditions result when the saturated used sorbent is disposed of in a natural environment and exposed to the natural elements such as found in a landfill or other natural site. The action under these natural conditions is such that as the oil saturated sorbent drains naturally while it sits exposed to the elements of changing weather which eventually produce the requisite temperature range of 45° F. to 115° F., and the requisite moisture in the form of precipitation, only then after the oil has drained sufficiently, or washed away sufficiently from the protecting oleophobic and hydrophilic encapsulation, can the moisture reach the protected oleophobic and hydrophilic encapsulation containing the dry mixture of microbes and nutrients to trigger their reactivation from the dormant state while simultaneously making available the accompanying nutrients, the necessary moisture, the necessary oxygen, and the extensive store of nutrients of the ground, without the danger of being immersed or saturated in liquid hydrocarbons but instead at their optimum concentration to begin bioremediation.

The preferred embodiment for the manufacturing of this composition proceeds as follows with reference to FIG. 1. Waste newspaper, cardboard, or any other waste paper products, collected from local towns is placed on conveyer belt 11. The paper is conveyed into the paper shredder 12. The shredded paper is combined with powdered BORON-10® fire retardant from the fire retardant feeder 13 while the combined fire retardant and shredded paper are being ground together in the hammermill 14. The dry granulated microbe additive is fed into the dust auger 15 which enters into the exhaust fan of hammermill 14. This combination of materials then enters cyclone 16 where the green dye pumped from a 55 gallon drum is injected in a fine mist through a nozzle that is positioned near the bottom of cyclone 16 providing coloring to the particles as they settle into the bagger 17 below. Heated paraffin is pumped from a heated 55 gallon drum in the liquid state in a fine mist through a nozzle that is positioned inside bagger 17 where it is also thoroughly mixed and agitated before bagging. The finished material leaves the bagger where it is packaged in twenty pound bags, sewn, flattened, and ready for shipment.

The composition when manufactured in the preferred embodiment has an extremely light bulk density when compared to other sorbents. When air-blown and allowed to settle in a box, it weighs 1.6 lbs/ft$^3$. By tapping the box or letting it settle over a period of time, it settles to a density of 2.1 lbs/ft$^3$. When packaged, the bags are forcibly compressed. The density is then 7.0 lbs/ft$^3$. However, when opened, the improved sorbent will again return to 2.1 lbs/ft$^3$.

Alternative sorbent substrates may also be used. These alternatives include organic or inorganic materials, in different forms such as fibrous, particulate, and/or micronized. Examples are diatomaceous earth, clay, silica, corncob, peatmoss, perlite, polypropylene, sawdust, cellulose, polystyrene, vermiculite, peat, cork, and the like.

The sorbent substrate may be rendered hydrophobic by hydrophobing treatments other than the one in the preferred embodiment. A conventional sizing treatment can be used, for example, rosin, starch, casein, soya protein, natural and synthetic resins, including resin monomers and prepolymers, as well as polymers. Thus, for example, the fibers can be rendered hydrophobic by sizing with water-insoluble polyvinyl alcohol, hydroxyethyl cellulose, ethyl cellulose, carboxymethyl cellulose, polyacrylate resin, alkyd resin, polyester resin, polyethylene or polypropylene. A thermoplastic material can be applied by melting, for example, thermoplastic polyacrylate, alkyd or polyester polymer or a polyethylene or polypropylene polymer, on the cellulose pulp fibers.

A variety of fire retardants can be used such as ammonium sulfate, aluminum sulfate, borax and/or boric acid and the like sufficient, to impart the characteristic of self extinguishability to the unused sorbent.

Microbes other than DBC PLUS® TYPE R-5 DRIED BACTERIAL CULTURE may be used. Some specific names and sources of other appropriate bioremediating microbes for use in the present invention are; ACTINOMUCOR ELEGNES ATCC 20613 which may be obtained from American Type Culture Collection, of Rockville, Md.; GEOTRICHUM MARINUM ATCC 20614 which may be obtained from American Type Culture Collection, of Rockville, Md.; THE OPPENHEIMER FORMULA, available from Oppenheimer Environmental Company of Austin, Tex. and the like.

The effectiveness of the microbes can be enhanced by being combined with the appropriate microbial nutrients assimilable by the microorganisms where the nutrients can be organic and/or inorganic, fibrous, particulate and/or micronized, such as but not limited to nitrogenous and phosphorus containing compounds that are usually deficient in oil bearing formations and/or other typical microbial nutrients such as hay, seaweed, sucrose, wheat bran, soy, baking soda, potassium, glucose, corn starch, ham, cereal husks, and the like, and/or inorganic nutrients such as disodium hydrogen phosphate, monosodium dihydrogen phosphate, calcium, magnesium, zinc, iron, sodium, and sulfur and/or other nutrients, mineral salts, and the like.

The effectiveness of the microbes are enhanced by being coated, and/or encapsulated, and/or bound and/or otherwise protected most preferably by an oleophobic and hydrophilic coating together with their respective nutrients to protect the contained microbes and nutrients from over exposure to sorbed material thus reducing the mortality rate of the microbes and enabling their survival up to and during the period that the sorbent is saturated with either liquid hydrocarbons and/or other sorbed liquids and continuing to protect the microbes until the used sorbent is ultimately disposed of, whether disposed of in the natural environment or in a specially created containment or environment. Examples of such a coating material are sugar, starch and gelatin. Coatings which are oleophobic or semi-oleophobic are common paraffin, and other waxes, also polyvinyl alcohol, hydroxyethyl cellulose, synthetic resins, and the like.

The survival and effectiveness of the microbes are enhanced by being coated, and/or encapsulated, and/or bound and/or otherwise protected by an oleophobic and hydrophilic coating that is also a microbial nutrient or combination of nutrients such as starch, sucrose, gelatin and/or such other nutrients. This option provides a unique opportunity to combine the nutrient and encapsulation material into one ingredient.

Product prepared in accordance with the above mentioned composition and procedure is suitable for biotreatment of all of the following substances: fresh or weathered crude oil, oil mousse and foams, heavy petroleum greases, refinery tars and derivatives, oil sludges, oil slop, drilling mud residues, lubricant spillage onto railroad track beds, parking lots and garage floors, synthetic oils and fuels, coolants, alcohols, sewage, cyanides, solvents, oils with PCB's, aromatic and aliphatic petroleum hydrocarbons and are also suitable for absorption of other contaminant discharges into both marine waters, fresh waters and onto land such as blood, plasma, dioxins, polymers, insecticides, toxins, biologicals, etc. Test results indicate a sorbency of greater than 30 to 1 by weight for medium viscosity oil removed from oil spills on water or on land. This sorbency ratio of greater than 30 to 1 by weight for medium viscosity oil has been independently confirmed in tests conducted by ENVIRONMENT CANADA on Sep. 23, 1993 (See TABLE I and II below) which indicated pickup ratio as high as 36 to 1 by weight. The two grams of oil digesting microbes together with their nutrients bound together in granules with a protective oleophobic and hydrophilic encapsulant in the above manufactured example of a 20 pound bag, would contain approximately $2 \times 10^6$ (two billion) microbes. The requirement to bioremediate 20 pounds of saturated sorbent, which according to test results could contain as much as 720 pounds of liquid hydrocarbon, would require a cell population of $2 \times 10^{13}$ to provide effective bioremediation. Under ideal conditions of bioremediation this initial seed population of $2 \times 10^6$ cells should theoretically be able to reach a population of $2 \times 10^{13}$ cells within three days. In field biotreatment, however, optimal multiplication rates are rarely achieved due to site limiting factors, competition and predation, resulting in retardation of the growth curve. Dilution of the biomass must also be expected in marine spills. As a result, reaching a population of $2 \times 10^{13}$ cells may require several weeks.

Another highly advantageous property of the sorbent of the present example is an oil absorbing composition which displays a low explosion hazard and a low flammability, but which after sorption of oil is flammable and entirely consumed when burned. Thus, the composition can safely be used in the workplace. Moreover, the oil sorbing composition of this example is based upon waste cellulose pulp fiber materials available at low cost and also is biodegradable, non-corrosive, non-toxic, non-irritating, and is safe to humans, plants, animals, and the environment. Additionally, this sorbent provides rapid bioremediation of oil saturated, used sorbent due to improved microbial survival and effectiveness from encapsulation and protection of microbes that are in a dormant state combined with microbial nutrients within an oleophobic and hydrophilic protective nutrient coating to trigger activation of the microbes specifically under the conditions of their optimum effectiveness, survival and growth. This sorbent is suitable for oil spills on water and on land, is treated to float on water, to aggressively sorb oil, and to reject water enabling the recovery of oil spilled on water without contamination by water. Oil recovery is accomplished by compression of saturated, used sorbent thus used sorbent can be compressed to facilitate up to 70 percent or higher recovery of oil without contamination by water and can be reused repeatedly after compression. This used sorbent can be burned as fuel with only one percent ash content contributed by the sorbent and can be used loose, in pads, socks, pillows, booms or can be used as a filter element to separate oil from water. This sorbent is non-abrasive to machinery, is colored to facilitate product identification, and benefits the community by diverting waste paper from being disposed of in local landfills which instead is converted into a product that protects the environment. This sorbent has other environmental benefits relating to low embodied energy and low energy to manufacture thereby conserving energy resources and uses a simple low-tech process, readily available machinery, low capitalization,

TABLE I

| | Light Crude Oil[1] | | |
|---|---|---|---|
| | Sample (all at 19° C.) | | |
| Sample weight (g) | 5.52 | 5.51 | 5.56 |
| Weight of sorbent and oil (g) | 101.54 | 98.11 | 117.54 |
| Initial capacity (g liquid/g sorbent) | 17.4 | 16.8 | 20.1 |

[1]Light Crude Oil: 40 cp., 0.895 g/cm$^3$ at 21° C.

TABLE II

| | Medium Viscosity Oil[2] | | |
|---|---|---|---|
| | Sample (all at 19.5° C.) | | |
| Sample weight (g) | 5.56 | 5.57 | 5.56 |
| Weight of sorbent and oil (g) | 172.42 | 187.09 | 206.80 |
| Initial capacity (g liquid/g sorbent) | 30.0 | 32.6 | 36.2 |

[2]Medium Viscosity Oil: 4300 cp., 0.968 g/cm$^3$ at 21° C.

and low cost waste material for its main ingredients resulting in a simple, effective, low cost sorbent.

It is thought that many of the attendant advantages will be understood from the foregoing description and it will be apparent that various changes may be made in the composition and materials used for the parts thereof without departing from the spirit and scope of the invention or sacrificing all of its material advantages, the form hereinbefore described being merely a preferred or exemplary embodiment thereof.

I claim:

1. A sorbent composition comprising:

a particulated sorbent substrate, from about 35 to about 97 percent by weight of said sorbent composition;

a fire retardant added to said sorbent substrate, from about 0.5 to about 20 percent by weight of said sorbent composition; and said substrate treated with a hydrophobic additive, from about 45 to about 2.5 percent by weight of said sorbent composition creating thereby a sorbent composition which sorbs, is hydrophobic and fire retardant.

2. The composition of claim 1 wherein said substrate is at least one selected from the group consisting of diatomaceous earth, clay, silica, corncob, peatmoss, perlite, polypropylene, sawdust, cellulose, polystyrene, vermiculite, peat, and cork.

3. The composition of claim 1 wherein said substrate is finely ground cellulose.

4. The composition of claim 2 wherein said fire retardant is selected from the group consisting of ammonium sulfate, aluminum sulfate, borax, sulfate activated boric acid and boric acid.

5. The composition of claim 3 wherein said fire retardant is sulfate activated boric acid.

6. The composition of claim 4 wherein said hydrophobic additive is at least one selected from the group consisting of waxes, rosins, starches, caseins, soya proteins, natural resins, synthetic resins, water-insoluble polyvinyl alcohol, hydroxyethyl cellulose, ethyl cellulose, carboxymethyl cellulose, polyethylene, polypropylene, polyacrylate, and polyester.

7. The composition of claim 5 wherein said hydrophobic additive is a wax and a ratio by weight of said substrate to said retardant to said additive is about 85 to about 5 to about 10.

8. The composition of claim 1 further comprising oil-digesting microbes admixed with said substrate and said retardant with said hydrophobic additive, said microbes added at a range of from between about 1×10$^5$ to about 1×10$^{11}$ of microbes per pound of sorbed liquid capacity of said sorbent substrate.

9. The composition of claim 8 wherein, before addition to said substrate and said retardant, said microbes are mixed with a nutrient formulation, said nutrient formulation comprising a nutrient at least one of which is selected from the group consisting of sugar, wheat bran, hay, seaweed, soy, sodium bicarbonate, potassium, corn starch, ham and cereal husks, and a nutrient salt supplement said nutrient salt supplement comprising disodium hydrogen phosphate, monosodium dihydrogen phosphate, nitrogen, phosphorus, calcium, magnesium, zinc, iron, sodium, mineral salts and sulfur, and a pH buffer in an amount sufficient to achieve a pH of between about 6.8–7.2 when hydrated creating thereby a microbe nutrient mixture.

10. The composition of claim 9 further comprising a second additive, said second additive being oleophobic and an encapsulant of said microbe nutrient mixture wherein said second additive is at least one selected from the group consisting of sugar, starch, gelatin, waxes polyvinyl alcohol, hydroxyethyl cellulose, and synthetic resins.

11. The composition of claim 10 wherein said nutrient is functionally said second additive and is sugar.

12. The composition of claim 1 further comprising a dye added to color said substrate.

13. The composition of claim 12 wherein said dye is green.

14. A method of manufacture of an improved sorbent comprising the steps of:

shredding a substrate;

combining said substrate with fire retardant; spraying said substrate and said retardant with a hydrophobic and oleophilic additive.

15. The method of manufacture of an improved sorbent of claim 14 further comprising the step of adding a dry granulated mixture of encapsulated microbes and nutrients to said sorbent.

16. The composition of claim 6 further comprising oil-digesting microbes admixed to said substrate and said retardant with said hydrophobic additive, said microbes added at a range of from between about 1×10$^5$ to about 1×10$^{11}$ of microbes per pound of sorbed liquid capacity of said sorbent substrate.

17. The composition of claim 8 wherein, before addition to said substrate and said retardant, said microbes are mixed with a nutrient formulation, said nutrient formulation comprising a nutrient selected from the group consisting of sugar, wheat bran, hay, seaweed, soy, sodium bicarbonate, potassium, corn starch, ham, cereal husks, and combinations thereof and a nutrient salt supplement, said nutrient salt supplement comprising disodium hydrogen phosphate, monosodium dihydrogen phosphate, nitrogen, phosphorus, calcium, magnesium, zinc, iron, sodium, mineral salts and sulfur, and a pH buffer in an amount sufficient to achieve a pH of between about 6.8–7.2 when hydrated creating thereby a microbe nutrient mixture.

18. The composition of claim 17 further comprising a second additive, said second additive being both oleophobic and hydrophilic and an encapsulant of said microbe nutrient mixture wherein said second additive is at least one selected from the group consisting of sugar, starch and gelatin.

19. The composition of claim 18 wherein said nutrient is functionally said second additive and is sugar.

20. A sorbent composition comprising:

a particulated sorbent substrate, from about 35 to about 97 percent by weight of said sorbent composition, treated with a hydrophobic additive, from about 45 to about 2.5 percent by weight of said sorbent composition;

a fire retardant added to said sorbent substrate treated with a hydrophobic additive, from about 0.5 to about 20 percent by weight of said sorbent composition;

a nutrient formulation, said nutrient formulation comprising a nutrient selected from the group consisting of sugar, wheat bran, hay, seaweed, soy, sodium bicarbonate, potassium, corn starch, ham, cereal husks, and combinations thereof and a nutrient salt supplement, said nutrient salt supplement comprising disodium hydrogen phosphate, monosodium dihydrogen phosphate, nitrogen, phosphorus, calcium, magnesium, zinc, iron, sodium, mineral salts and sulfur, and a pH buffer in an amount sufficient to achieve a pH of between about 6.8–7.2 when hydrated;

oil-digesting microbes admixed with said substrate and said retardant with said hydrophobic additive, said microbes added at a range of from between about $1\times10^5$ to about $1\times10^{11}$ of microbes per pound of sorbed liquid capacity of said sorbent substrate;

said nutrient formulation admixed with said microbes creating thereby a microbe nutrient mixture; and a second additive, said second additive being oleophobic and hydrophilic and an encapsulant of said microbe nutrient mixture.

* * * * *